US010080992B2

(12) United States Patent
Nagavarapu et al.

(10) Patent No.: US 10,080,992 B2
(45) Date of Patent: Sep. 25, 2018

(54) APPARATUS AND SYSTEM FOR SWING ADSORPTION PROCESSES RELATED THERETO

(71) Applicants: Ananda K. Nagavarapu, Houston, TX (US); Ransdall K. Smith, Spring, TX (US); Russell H. Oelfke, Houston, TX (US)

(72) Inventors: Ananda K. Nagavarapu, Houston, TX (US); Ransdall K. Smith, Spring, TX (US); Russell H. Oelfke, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 100 days.

(21) Appl. No.: 15/233,640

(22) Filed: Aug. 10, 2016

(65) Prior Publication Data

US 2017/0056815 A1 Mar. 2, 2017

Related U.S. Application Data

(60) Provisional application No. 62/213,273, filed on Sep. 2, 2015.

(51) Int. Cl.
*B01D 53/047* (2006.01)
*B01D 53/04* (2006.01)
*C10L 3/10* (2006.01)

(52) U.S. Cl.
CPC ....... *B01D 53/0462* (2013.01); *B01D 53/047* (2013.01); *B01D 53/0407* (2013.01);
(Continued)

(58) Field of Classification Search
CPC .. Y02C 10/08; B01D 53/0407; B01D 53/047; B01D 53/0462; B01D 53/0473;
(Continued)

(56) References Cited

U.S. PATENT DOCUMENTS 1,868,138 A   7/1932  Fisk
3,103,425 A   9/1963  Meyer ............................. 55/62
(Continued)

FOREIGN PATENT DOCUMENTS

CA   2297590   9/2000
CA   2237103   12/2001
(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.
(Continued)

*Primary Examiner* — Frank M Lawrence, Jr.
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to treat the feed stream to form a stream that complies with nitrogen rejection specifications. The process may involve using at least a portion of the nitrogen rejection process product streams as a purge for the swing adsorption process.

22 Claims, 3 Drawing Sheets

(52) U.S. Cl.
CPC .... *B01D 53/0473* (2013.01); *B01D 2253/108* (2013.01); *B01D 2253/116* (2013.01); *B01D 2256/24* (2013.01); *B01D 2256/245* (2013.01); *B01D 2257/304* (2013.01); *B01D 2257/40* (2013.01); *B01D 2257/504* (2013.01); *B01D 2257/80* (2013.01); *B01D 2259/4009* (2013.01); *B01D 2259/40013* (2013.01); *B01D 2259/40043* (2013.01); *B01D 2259/40054* (2013.01); *B01D 2259/4062* (2013.01); *B01D 2259/40086* (2013.01); *B01D 2259/416* (2013.01); *C10L 3/104* (2013.01); *C10L 3/106* (2013.01); *C10L 2290/543* (2013.01); *Y02C 10/08* (2013.01)

(58) Field of Classification Search
CPC ........ B01D 2253/108; B01D 2253/116; B01D 2256/24; B01D 2256/245; B01D 2257/304; B01D 2257/40; B01D 2257/504; B01D 2257/80; B01D 2259/40013; B01D 2259/40043; B01D 2259/40054; B01D 2259/40086; B01D 2259/4009; B01D 2259/4062; B01D 2259/416
USPC ..... 95/96–98, 100, 104, 105, 117, 122, 139; 96/108, 121, 132, 134; 62/618, 620
See application file for complete search history.

(56) References Cited

U.S. PATENT DOCUMENTS

| | | | |
|---|---|---|---|
| 3,124,152 A | 3/1964 | Payne | 137/269.5 |
| 3,142,547 A | 7/1964 | Marsh | 55/26 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,187,092 A | 2/1980 | Woolley | 62/48 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,761,167 A * | 8/1988 | Nicholas | B01D 53/047 62/626 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,486,227 A | 1/1996 | Kumar et al. | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,769,928 A | 6/1998 | Leavitt | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,912,426 A | 6/1999 | Smolarek et al. | |
| 5,924,307 A | 7/1999 | Nenov | 62/643 |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,096,115 A | 8/2000 | Kleinberg et al. | |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,152,991 A | 11/2000 | Ackley | |
| 6,156,101 A | 12/2000 | Naheiri | |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,183,538 B1 | 2/2001 | Naheiri | |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,425,938 B1 | 7/2002 | Xu et al. | |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer et al. | 96/125 |
| 6,497,750 B2 | 12/2002 | Butwell et al. | 95/96 |
| 6,500,234 B1 | 12/2002 | Ackley et al. | |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |

(56) References Cited

U.S. PATENT DOCUMENTS

| | | | | |
|---|---|---|---|---|
| 6,630,012 | B2 | 10/2003 | Wegeng et al. | 95/106 |
| 6,631,626 | B1 | 10/2003 | Hahn | 62/612 |
| 6,641,645 | B1 | 11/2003 | Lee et al. | 95/98 |
| 6,651,645 | B1 | 11/2003 | Nunez-Suarez | 126/9 R |
| 6,660,064 | B2 | 12/2003 | Golden et al. | 95/96 |
| 6,660,065 | B2 | 12/2003 | Byrd et al. | 95/117 |
| 6,692,626 | B2 | 2/2004 | Keefer et al. | 204/491 |
| 6,712,087 | B2 | 3/2004 | Hill et al. | 137/240 |
| 6,742,507 | B2 | 6/2004 | Keefer et al. | 123/585 |
| 6,746,515 | B2 | 6/2004 | Wegeng et al. | 95/96 |
| 6,752,852 | B1 | 6/2004 | Jacksier et al. | 95/117 |
| 6,770,120 | B2 | 8/2004 | Neu et al. | 95/96 |
| 6,773,225 | B2 | 8/2004 | Yuri et al. | 415/1 |
| 6,802,889 | B2 | 10/2004 | Graham et al. | 95/96 |
| 6,814,771 | B2 | 11/2004 | Scardino et al. | 55/385.3 |
| 6,835,354 | B2 | 12/2004 | Woods et al. | 422/139 |
| 6,840,985 | B2 | 1/2005 | Keefer | 96/125 |
| 6,866,950 | B2 | 3/2005 | Connor et al. | 429/13 |
| 6,889,710 | B2 | 5/2005 | Wagner | 137/625.46 |
| 6,890,376 | B2 | 5/2005 | Arquin et al. | 96/134 |
| 6,893,483 | B2 | 5/2005 | Golden et al. | 95/96 |
| 6,902,602 | B2 | 6/2005 | Keefer et al. | 95/97 |
| 6,916,358 | B2 | 7/2005 | Nakamura et al. | 95/96 |
| 6,918,953 | B2 | 7/2005 | Lomax, Jr. et al. | 96/130 |
| 6,921,597 | B2 | 7/2005 | Keefer et al. | 429/34 |
| 6,974,496 | B2 | 12/2005 | Wegeng et al. | 96/126 |
| 7,025,801 | B2 | 4/2006 | Monereau | 95/8 |
| 7,027,929 | B2 | 4/2006 | Wang | 702/17 |
| 7,029,521 | B2 | 4/2006 | Johansson | 96/128 |
| 7,074,323 | B2 | 7/2006 | Ghijsen | 208/101 |
| 7,077,891 | B2 | 7/2006 | Jaffe et al. | 96/108 |
| 7,087,331 | B2 | 8/2006 | Keefer et al. | 429/17 |
| 7,094,275 | B2 | 8/2006 | Keefer et al. | 96/125 |
| 7,097,925 | B2 | 8/2006 | Keefer et al. | 429/9 |
| 7,112,239 | B2 | 9/2006 | Kimbara et al. | 96/108 |
| 7,117,669 | B2 | 10/2006 | Kaboord et al. | 60/288 |
| 7,122,073 | B1 | 10/2006 | Notaro et al. | |
| 7,128,775 | B2 | 10/2006 | Celik et al. | 95/96 |
| 7,144,016 | B2 | 12/2006 | Gozdawa | 277/399 |
| 7,160,356 | B2 | 1/2007 | Koros et al. | 95/50 |
| 7,160,367 | B2 | 1/2007 | Babicki et al. | 96/116 |
| 7,166,149 | B2 | 1/2007 | Dunne et al. | 95/113 |
| 7,172,645 | B1 | 2/2007 | Pfister et al. | 95/116 |
| 7,189,280 | B2 | 3/2007 | Alizadeh-Khiavi et al. | 95/130 |
| 7,250,073 | B2 | 7/2007 | Keefer et al. | 95/96 |
| 7,250,074 | B2 | 7/2007 | Tonkovich et al. | 95/130 |
| 7,255,727 | B2 | 8/2007 | Monereau et al. | 95/96 |
| 7,258,725 | B2 | 8/2007 | Ohmi et al. | 95/41 |
| 7,276,107 | B2 | 10/2007 | Baksh et al. | 95/96 |
| 7,279,029 | B2 | 10/2007 | Occhialini et al. | 96/121 |
| 7,285,350 | B2 | 10/2007 | Keefer et al. | 429/34 |
| 7,297,279 | B2 | 11/2007 | Johnson et al. | 210/669 |
| 7,311,763 | B2 | 12/2007 | Neary | 96/121 |
| RE40,006 | E | 1/2008 | Keefer et al. | 95/100 |
| 7,314,503 | B2 | 1/2008 | Landrum et al. | 95/50 |
| 7,354,562 | B2 | 4/2008 | Ying et al. | 423/437.2 |
| 7,387,849 | B2 | 6/2008 | Keefer et al. | 429/34 |
| 7,390,350 | B2 | 6/2008 | Weist, Jr. et al. | 95/100 |
| 7,404,846 | B2 | 7/2008 | Golden et al. | 95/103 |
| 7,438,079 | B2 | 10/2008 | Cohen et al. | |
| 7,449,049 | B2 | 11/2008 | Thomas et al. | 95/123 |
| 7,456,131 | B2 | 11/2008 | Klett et al. | 502/417 |
| 7,510,601 | B2 | 3/2009 | Whitley et al. | 96/121 |
| 7,527,670 | B2 | 5/2009 | Ackley et al. | 95/96 |
| 7,553,568 | B2 | 6/2009 | Keefer | 429/13 |
| 7,578,864 | B2 | 8/2009 | Watanabe et al. | 55/523 |
| 7,604,682 | B2 | 10/2009 | Seaton | 95/96 |
| 7,637,989 | B2 | 12/2009 | Bong | 96/130 |
| 7,641,716 | B2 | 1/2010 | Lomax, Jr. et al. | 95/96 |
| 7,645,324 | B2 | 1/2010 | Rode et al. | 95/96 |
| 7,651,549 | B2 | 1/2010 | Whitley | 95/96 |
| 7,674,319 | B2 | 3/2010 | Lomax, Jr. et al. | 95/19 |
| 7,674,539 | B2 | 3/2010 | Keefer et al. | 429/17 |
| 7,687,044 | B2 | 3/2010 | Keefer et al. | 422/211 |
| 7,713,333 | B2 | 5/2010 | Rege et al. | 95/96 |
| 7,717,981 | B2 | 5/2010 | LaBuda et al. | 95/96 |
| 7,722,700 | B2 | 5/2010 | Sprinkle | 95/22 |
| 7,731,782 | B2 | 6/2010 | Kelley et al. | 95/139 |
| 7,740,687 | B2 | 6/2010 | Reinhold, III | 95/96 |
| 7,744,676 | B2 | 6/2010 | Leitmayr et al. | 95/99 |
| 7,744,677 | B2 | 6/2010 | Barclay et al. | 95/114 |
| 7,758,051 | B2 | 7/2010 | Roberts-Haritonov et al. | 277/401 |
| 7,758,988 | B2 | 7/2010 | Keefer et al. | 429/34 |
| 7,763,098 | B2 | 7/2010 | Alizadeh-Khiavi et al. | 95/96 |
| 7,763,099 | B2 | 7/2010 | Verma et al. | 95/96 |
| 7,792,983 | B2 | 9/2010 | Mishra et al. | 709/231 |
| 7,793,675 | B2 | 9/2010 | Cohen et al. | |
| 7,806,965 | B2 | 10/2010 | Stinson | 95/187 |
| 7,819,948 | B2 | 10/2010 | Wagner | 95/100 |
| 7,828,877 | B2 | 11/2010 | Sawada et al. | 95/96 |
| 7,828,880 | B2 | 11/2010 | Moriya et al. | 95/210 |
| 7,854,793 | B2 | 12/2010 | Rarig et al. | 96/116 |
| 7,858,169 | B2 | 12/2010 | Yamashita | 428/116 |
| 7,862,645 | B2 | 1/2011 | Whitley et al. | 95/96 |
| 7,867,320 | B2 | 1/2011 | Baksh et al. | 95/96 |
| 7,902,114 | B2 | 3/2011 | Keefer et al. | |
| 7,938,886 | B2 | 5/2011 | Hershkowitz et al. | 95/115 |
| 7,947,118 | B2 | 5/2011 | Rarig et al. | 95/98 |
| 7,947,120 | B2 | 5/2011 | Deckman et al. | 95/139 |
| 7,959,720 | B2 | 6/2011 | Deckman et al. | 96/130 |
| 8,016,918 | B2 | 9/2011 | LaBuda et al. | 95/96 |
| 8,034,164 | B2 | 10/2011 | Lomax, Jr. et al. | 95/121 |
| 8,071,063 | B2 | 12/2011 | Reyes et al. | 423/248 |
| 8,128,734 | B2 | 3/2012 | Song | 95/96 |
| 8,142,745 | B2 | 3/2012 | Reyes et al. | 423/213.2 |
| 8,142,746 | B2 | 3/2012 | Reyes et al. | 423/213.2 |
| 8,192,709 | B2 | 6/2012 | Reyes et al. | 423/245.1 |
| 8,210,772 | B2 | 7/2012 | Gillecriosd | 405/128.2 |
| 8,227,121 | B2 | 7/2012 | Adams et al. | 429/429 |
| 8,262,773 | B2 | 9/2012 | Northrop et al. | 95/114 |
| 8,262,783 | B2 | 9/2012 | Stoner et al. | 96/108 |
| 8,268,043 | B2 | 9/2012 | Celik et al. | 95/96 |
| 8,268,044 | B2 | 9/2012 | Wright et al. | 95/96 |
| 8,272,401 | B2 | 9/2012 | McLean | 137/625.11 |
| 8,287,629 | B2 | 10/2012 | Fujita et al. | 96/126 |
| 8,319,090 | B2 | 11/2012 | Kitamura | 136/244 |
| 8,337,594 | B2 | 12/2012 | Corma Canos et al. | 95/130 |
| 8,361,200 | B2 | 1/2013 | Sayari et al. | 95/139 |
| 8,361,205 | B2 | 1/2013 | Desai et al. | 96/121 |
| 8,377,173 | B2 | 2/2013 | Chuang | 95/135 |
| 8,444,750 | B2 | 5/2013 | Deckman et al. | 95/96 |
| 8,470,395 | B2 | 6/2013 | Khiavi et al. | 427/180 |
| 8,480,795 | B2 | 7/2013 | Siskin et al. | 95/235 |
| 8,512,569 | B2 | 8/2013 | Eaton et al. | 210/650 |
| 8,518,356 | B2 | 8/2013 | Schaffer et al. | 423/220 |
| 8,529,662 | B2 | 9/2013 | Kelley et al. | 95/96 |
| 8,529,663 | B2 | 9/2013 | Reyes et al. | 95/96 |
| 8,529,664 | B2 | 9/2013 | Deckman et al. | 95/96 |
| 8,529,665 | B2 | 9/2013 | Manning et al. | 95/96 |
| 8,535,414 | B2 | 9/2013 | Johnson et al. | 95/95 |
| 8,545,602 | B2 | 10/2013 | Chance et al. | 95/96 |
| 8,551,444 | B2 | 10/2013 | Agnihotri et al. | 423/648.1 |
| 8,573,124 | B2 | 11/2013 | Havran et al. | 102/206 |
| 8,591,627 | B2 | 11/2013 | Jain | 95/52 |
| 8,591,634 | B2 | 11/2013 | Winchester et al. | 96/127 |
| 8,616,233 | B2 | 12/2013 | McLean et al. | 137/246.22 |
| 8,657,922 | B2 | 2/2014 | Yamawaki et al. | 95/96 |
| 8,673,059 | B2 | 3/2014 | Leta et al. | 95/104 |
| 8,680,344 | B2 | 3/2014 | Weston et al. | |
| 8,715,617 | B2 | 5/2014 | Genkin et al. | 423/652 |
| 8,752,390 | B2 | 6/2014 | Wright et al. | 60/780 |
| 8,778,051 | B2 | 7/2014 | Weist, Jr. et al. | 95/98 |
| 8,784,533 | B2 | 7/2014 | Leta et al. | 95/97 |
| 8,784,534 | B2 | 7/2014 | Kamakoti et al. | 95/97 |
| 8,784,535 | B2 | 7/2014 | Ravikovitch et al. | 95/98 |
| 8,795,411 | B2 | 8/2014 | Hufton et al. | 95/90 |
| 8,808,425 | B2 | 8/2014 | Genkin et al. | 95/96 |
| 8,808,426 | B2 | 8/2014 | Sundaram | 95/96 |
| 8,814,985 | B2 | 8/2014 | Gerds et al. | 95/90 |
| 8,852,322 | B2 | 10/2014 | Gupta et al. | 95/136 |
| 8,858,683 | B2 | 10/2014 | Deckman | 95/96 |
| 8,875,483 | B2 | 11/2014 | Wettstein | 60/39.52 |
| 8,906,138 | B2 | 12/2014 | Rasmussen et al. | 95/96 |

(56) References Cited

U.S. PATENT DOCUMENTS

| | | | |
|---|---|---|---|
| 8,921,637 B2 | 12/2014 | Sundaram et al. | 585/823 |
| 8,939,014 B2 | 1/2015 | Kamakoti et al. | 73/38 |
| 9,005,561 B2 | 4/2015 | Leta et al. | |
| 9,017,457 B2 | 4/2015 | Tammera | 95/96 |
| 9,028,595 B2 | 5/2015 | Sundaram et al. | |
| 9,034,078 B2 | 5/2015 | Wanni et al. | 95/8 |
| 9,034,079 B2 | 5/2015 | Deckman et al. | 95/96 |
| 9,050,553 B2 | 6/2015 | Alizadeh-Khiavi et al. | |
| 9,067,168 B2 | 6/2015 | Frederick et al. | 96/108 |
| 9,095,809 B2 | 8/2015 | Deckman et al. | 95/45 |
| 9,108,145 B2 | 8/2015 | Kalbassi et al. | 95/8 |
| 9,120,049 B2 | 9/2015 | Sundaram et al. | 96/121 |
| 9,126,138 B2 | 9/2015 | Deckman et al. | 95/95 |
| 9,162,175 B2 | 10/2015 | Sundaram | 96/121 |
| 9,168,485 B2 | 10/2015 | Deckman et al. | 95/96 |
| 2001/0047824 A1 | 12/2001 | Hill et al. | 137/312 |
| 2002/0053547 A1 | 5/2002 | Schlegel et al. | |
| 2002/0124885 A1 | 9/2002 | Hill et al. | 137/312 |
| 2002/0162452 A1 | 11/2002 | Butwell et al. | 95/96 |
| 2003/0075485 A1 | 4/2003 | Ghijsen | 208/308 |
| 2003/0129101 A1 | 7/2003 | Zettel | 422/179 |
| 2003/0131728 A1 | 7/2003 | Kanazirev et al. | 95/96 |
| 2003/0170527 A1 | 9/2003 | Finn et al. | 429/34 |
| 2003/0202918 A1 | 10/2003 | Ashida et al. | 422/180 |
| 2003/0205130 A1 | 11/2003 | Neu et al. | 95/90 |
| 2003/0223856 A1 | 12/2003 | Yuri et al. | 415/1 |
| 2004/0099142 A1 | 5/2004 | Arquin et al. | 96/134 |
| 2004/0118277 A1 | 6/2004 | Kim | |
| 2004/0197596 A1 | 10/2004 | Connor et al. | 428/630 |
| 2004/0232622 A1 | 11/2004 | Gozdawa | 277/401 |
| 2005/0014022 A1 | 1/2005 | Keefer et al. | 96/124 |
| 2005/0109419 A1 | 5/2005 | Ohmi et al. | 141/4 |
| 2005/0114032 A1 | 5/2005 | Wang | 702/14 |
| 2005/0129952 A1 | 6/2005 | Sawada et al. | 428/409 |
| 2005/0145111 A1 | 7/2005 | Keefer et al. | 96/124 |
| 2005/0150378 A1 | 7/2005 | Dunne et al. | 95/113 |
| 2005/0229782 A1 | 10/2005 | Monereau et al. | 95/96 |
| 2005/0252378 A1 | 11/2005 | Celik et al. | 96/121 |
| 2006/0048648 A1 | 3/2006 | Gibbs et al. | 96/108 |
| 2006/0049102 A1 | 3/2006 | Miller et al. | 210/500.27 |
| 2006/0076270 A1 | 4/2006 | Poshusta et al. | 208/208 |
| 2006/0099096 A1 | 5/2006 | Shaffer et al. | 418/55.1 |
| 2006/0105158 A1 | 5/2006 | Fritz et al. | 428/317.9 |
| 2006/0162556 A1 | 7/2006 | Ackley et al. | 95/96 |
| 2006/0165574 A1 | 7/2006 | Sayari | 423/210 |
| 2006/0169142 A1 | 8/2006 | Rode et al. | 96/129 |
| 2006/0236862 A1 | 10/2006 | Golden et al. | 95/96 |
| 2007/0084241 A1 | 4/2007 | Kretchmer et al. | 63/29.2 |
| 2007/0084344 A1 | 4/2007 | Moriya et al. | 95/210 |
| 2007/0222160 A1 | 9/2007 | Roberts-Haritonov et al. | 277/387 |
| 2007/0253872 A1 | 11/2007 | Keefer et al. | 422/143 |
| 2007/0261550 A1 | 11/2007 | Ota | |
| 2007/0261557 A1 | 11/2007 | Gadkaree et al. | 96/121 |
| 2007/0283807 A1 | 12/2007 | Whitley | 95/96 |
| 2008/0051279 A1 | 2/2008 | Klett et al. | 502/60 |
| 2008/0072822 A1 | 3/2008 | White | 118/722 |
| 2008/0128655 A1 | 6/2008 | Garg et al. | 252/373 |
| 2008/0282883 A1 | 11/2008 | Rarig et al. | 95/96 |
| 2008/0282884 A1 | 11/2008 | Kelley et al. | 95/96 |
| 2008/0282885 A1 | 11/2008 | Deckman et al. | 95/98 |
| 2008/0282886 A1 | 11/2008 | Reyes et al. | 95/98 |
| 2008/0282887 A1 | 11/2008 | Chance et al. | 95/98 |
| 2008/0282892 A1 | 11/2008 | Deckman et al. | 96/140 |
| 2008/0289497 A1 | 11/2008 | Barclay et al. | 95/114 |
| 2008/0307966 A1 | 12/2008 | Stinson | 95/187 |
| 2008/0314550 A1 | 12/2008 | Greco | 165/4 |
| 2009/0004073 A1 | 1/2009 | Gleize et al. | 422/180 |
| 2009/0014902 A1 | 1/2009 | Koivunen et al. | 265/11 |
| 2009/0025553 A1 | 1/2009 | Keefer et al. | 95/96 |
| 2009/0025555 A1 | 1/2009 | Lively et al. | |
| 2009/0037550 A1 | 2/2009 | Mishra et al. | 708/208 |
| 2009/0071333 A1 | 3/2009 | LaBuda et al. | 95/96 |
| 2009/0079870 A1 | 3/2009 | Matsui | 348/558 |
| 2009/0107332 A1 | 4/2009 | Wagner | 95/100 |
| 2009/0151559 A1 | 6/2009 | Verma et al. | 95/96 |
| 2009/0162268 A1 | 6/2009 | Hufton et al. | 423/210 |
| 2009/0180423 A1 | 7/2009 | Kroener | 370/328 |
| 2009/0241771 A1 | 10/2009 | Manning et al. | 95/15 |
| 2009/0284013 A1 | 11/2009 | Anand et al. | 290/52 |
| 2009/0294366 A1 | 12/2009 | Wright et al. | |
| 2009/0308248 A1 | 12/2009 | Siskin et al. | 95/236 |
| 2009/0314159 A1 | 12/2009 | Haggerty | 95/90 |
| 2010/0059701 A1 | 3/2010 | McLean | 251/304 |
| 2010/0077920 A1 | 4/2010 | Baksh et al. | 95/97 |
| 2010/0089241 A1 | 4/2010 | Stoner et al. | 96/125 |
| 2010/0186445 A1 | 7/2010 | Minta et al. | 62/606 |
| 2010/0212493 A1 | 8/2010 | Rasmussen et al. | 95/45 |
| 2010/0251887 A1 | 10/2010 | Jain | 95/46 |
| 2010/0252497 A1 | 10/2010 | Ellison et al. | 210/500.1 |
| 2010/0263534 A1 | 10/2010 | Chuang | 95/139 |
| 2010/0282593 A1 | 11/2010 | Speirs et al. | 203/11 |
| 2010/0288704 A1 | 11/2010 | Amsden et al. | 210/688 |
| 2011/0011803 A1 | 1/2011 | Koros | |
| 2011/0031103 A1 | 2/2011 | Deckman et al. | 203/41 |
| 2011/0067440 A1 | 3/2011 | Van Aken | 62/613 |
| 2011/0067770 A1 | 3/2011 | Pederson et al. | 137/625.15 |
| 2011/0146494 A1 | 6/2011 | Desai et al. | 96/115 |
| 2011/0217218 A1 | 9/2011 | Gupta et al. | 423/228 |
| 2011/0277620 A1 | 11/2011 | Havran et al. | 89/1.14 |
| 2011/0291051 A1 | 12/2011 | Hershkowitz et al. | 252/373 |
| 2011/0296871 A1 | 12/2011 | Van Soest-Vercammen et al. | 62/636 |
| 2011/0308524 A1 | 12/2011 | Brey et al. | 128/205.12 |
| 2012/0024152 A1 | 2/2012 | Yamawaki et al. | 95/96 |
| 2012/0031144 A1 | 2/2012 | Northrop et al. | 62/617 |
| 2012/0067216 A1 | 3/2012 | Corma-Canos et al. | 95/95 |
| 2012/0152115 A1 | 6/2012 | Gerds et al. | 95/90 |
| 2012/0222551 A1 | 9/2012 | Deckman | 95/96 |
| 2012/0222552 A1 | 9/2012 | Ravikovitch et al. | 95/97 |
| 2012/0222553 A1 | 9/2012 | Kamakoti et al. | 95/99 |
| 2012/0222554 A1 | 9/2012 | Leta et al. | 95/104 |
| 2012/0222555 A1 | 9/2012 | Gupta et al. | 95/136 |
| 2012/0255377 A1 | 10/2012 | Kamakoti et al. | 73/863.23 |
| 2012/0308456 A1 | 12/2012 | Leta et al. | 423/228 |
| 2012/0312163 A1 | 12/2012 | Leta et al. | 95/97 |
| 2013/0061755 A1 | 3/2013 | Frederick et al. | 96/110 |
| 2013/0205828 A1* | 8/2013 | Sethna | B01D 53/047 62/607 |
| 2013/0225898 A1 | 8/2013 | Sundaram et al. | 585/802 |
| 2014/0013955 A1 | 1/2014 | Tammera et al. | 96/115 |
| 2014/0060326 A1 | 3/2014 | Sundaram | 95/96 |
| 2014/0157986 A1 | 6/2014 | Ravikovitch et al. | 95/96 |
| 2014/0208797 A1 | 7/2014 | Kelley et al. | 62/611 |
| 2014/0216254 A1 | 8/2014 | Tammera et al. | 95/114 |
| 2015/0013377 A1 | 1/2015 | Oelfke | |
| 2015/0068397 A1 | 3/2015 | Boulet et al. | |
| 2015/0196870 A1 | 7/2015 | Albright et al. | |
| 2017/0056814 A1* | 3/2017 | Marshall | B01D 53/0407 |
| 2017/0341011 A1* | 11/2017 | Nagavarapu | B01D 53/0446 |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| WO | WO2002/024309 | 3/2002 |

(56) References Cited

FOREIGN PATENT DOCUMENTS

| WO | WO2002/073728 | 9/2002 |
|----|---------------|--------|
| WO | WO2005/090793 | 9/2005 |
| WO | WO2011/139894 | 11/2011 |

OTHER PUBLICATIONS

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin (May 19, 2007) "Strategies for Sour Gas Field Developments," *Worley Parsons—Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM FOR SWING ADSORPTION PROCESSES RELATED THERETO

CROSS-REFERENCE TO RELATED APPLICATION

This application claims the benefit of U.S. Provisional Patent Application 62/213,273, filed Sep. 15, 2015, entitled Apparatus and System for Swing Adsorption Processes Related Thereto, the entirety of which is incorporated by reference herein.

Additionally, it is noted that this application is related to U.S. Provisional Application No. 62/213,262 filed Sep. 2, 2015, entitled "Apparatus and System for Swing Adsorption Processes Related Thereto;" U.S. Provisional Application No. 62/213,267 filed Sep. 2, 2015, entitled "Apparatus and System for Swing Adsorption Processes Related Thereto" and U.S. Provisional Application No. 62/213,270 filed Sep. 2, 2015, entitled "Apparatus and System for Combined Temperature and Pressure Swing Adsorption Processes Related Thereto."

FIELD

The present techniques relate to a system associated with a rapid cycle swing adsorption process. In particular, the system includes a rapid cycle swing adsorption process for treating the feed stream for a nitrogen rejection unit.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

Conventional processes are used to treat hydrocarbon containing streams containing $CO_2$ and $H_2O$ to prepare the stream for nitrogen rejection specifications. For example, a gas stream containing higher amounts of $CO_2$ is treated using solvents (e.g., amines, selexol and the like) or cryogenic processing (e.g., controlled freeze zones (CFZ), Ryan Holmes and the like) to a $CO_2$ specification closer to the nitrogen rejection process specifications. Subsequently, the stream is cleaned using a final polishing step using a conventional molecular sieve, which removes the $CO_2$ to the nitrogen rejection specification and dehydrates to nitrogen rejection specifications. Such stringent specifications are not applied on gas streams in typical Natural Gas Liquid (NGL) recovery systems. As such, for nitrogen rejection systems, additional treatment steps may be necessary for a feed stream.

Unfortunately, conventional processes for processing feed streams for a nitrogen rejection system have certain limitations. With nitrogen rejection operations, the size and weight of the conventional system, which are molecular sieve units, may be problematic. The operational costs of the gas treating process decreases as the product gas specification become less stringent. However, increases in the load on the molecular sieves results in the molecular sieve units becoming large and expensive. As such, there is a need to increase the range of the final polishing step to reduce the load on the initial gas treating step and improve the overall process costs. These problems are further compounded for floating facilities. The excessive weight and footprint for conventional systems add to the complexity of the floating facility and increase the size of the facilities. Also, the additional size and complexity increase the capital investment costs along with the operating costs for the floating facilities.

Accordingly, there remains a need in the industry for apparatus, methods, and systems that provided enhancements to the processing of feed streams into a nitrogen rejection system. Further, a need exists for a reduction in cost, size, and weight of facilities for treatment of feed streams prior to nitrogen rejection unit.

SUMMARY OF THE INVENTION

In one or more embodiments, the present techniques comprise a process for removing contaminants from a gaseous feed stream, the process comprising: a) performing one or more adsorption steps, wherein each of the one or more adsorption steps comprise passing a gaseous feed stream through an adsorbent bed unit having an adsorbent bed to separate one or more contaminants from the gaseous feed stream to form a product stream that is conducted away to a nitrogen rejection unit configured to form a methane stream and a nitrogen stream; b) performing one or more depressurization steps, wherein the pressure within the adsorbent bed unit is reduced by a predetermined amount with each successive depressurization step; c) performing a purge step, wherein the purge step comprises passing a purge stream into the adsorbent bed unit, wherein the purge stream is passed in a countercurrent direction relative to the direction of the feed stream and wherein the purge stream comprises one of at least a portion of the methane stream, at least a portion of the nitrogen stream, and any combination thereof; and d) repeating the steps a) to c) for at least one additional cycle, wherein the cycle duration is for a period greater than 1 second and less than 600 seconds.

In yet another embodiment, a system for removing contaminants from a gaseous feed stream is described. The system comprises an adsorbent bed unit and a nitrogen rejection unit in fluid communication with the adsorbent bed unit. The adsorbent bed unit is configured to separate contaminants from a gaseous feed stream and to output a product stream, wherein the gaseous feed stream is comprises an adsorbent bed and the adsorbent bed unit is configured to perform a rapid cycle swing adsorption process. The nitrogen rejection unit is configured to receive the product stream and separate the product stream into a methane stream and a nitrogen stream. Further, the adsorbent bed unit is configured to pass a purge stream through the adsorbent bed, wherein the purge stream is passed in a countercurrent direction relative to the direction of the feed stream and wherein the purge stream comprises one of at least a portion of the methane stream, at least a portion of the nitrogen stream, and any combination thereof.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
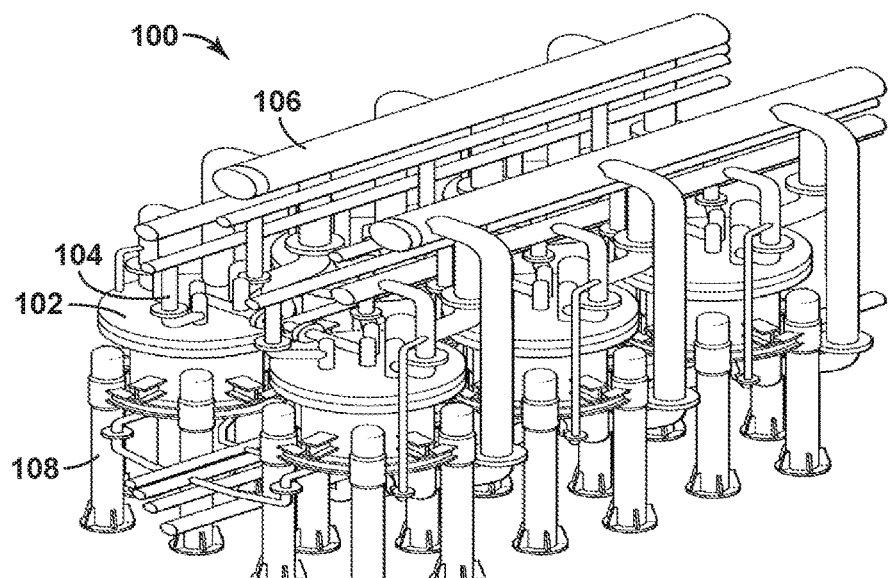
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, volume percent is based on standard conditions. The standard conditions are normalized to the temperature of 0° C. (e.g., 32° F.) and absolute pressure of 100 kiloPascals (kPa) (1 bar).

As used herein, "conduit" refers to a tubular member forming a channel through which something is conveyed. The conduit may include one or more of a pipe, a manifold, a tube or the like.

The provided processes, apparatus, and systems of the present techniques may be used to remove contaminants ($CO_2$, $H_2O$, and $H_2S$) from feed streams, such as hydrocarbon containing streams. As may be appreciated and as noted above, the hydrocarbon containing feed streams may have different compositions. For example, the hydrocarbon containing stream may include predominately hydrocarbons with nitrogen and specific amounts of $CO_2$ and/or water. For example, the hydrocarbon containing stream may have less than 2 volume percent $N_2$ based on the total volume of the gaseous feed stream; less than 10 volume percent $N_2$ based on the total volume of the gaseous feed stream; less than 40 volume percent $N_2$ based on the total volume of the gaseous feed stream; or less than 50 volume percent $N_2$ based on the total volume of the gaseous feed stream. As another example, the hydrocarbon containing stream may have less than 2 molar percent $N_2$ based on the total molar percent of the gaseous feed stream; less than 10 molar percent $N_2$ based on the total molar percent of the gaseous feed stream; less than 40 molar percent $N_2$ based on the total molar percent of the gaseous feed stream; or less than 50 molar percent $N_2$ based on the total molar percent of the gaseous feed stream. Further, for a nitrogen rejection unit, the feed stream may be limited in the amount of $CO_2$ and $H_2O$ that can be processed in the process. By way of example, the specifications for the nitrogen rejection process may be dehydrated to less than 0.1 parts per million molar (ppm) of $H_2O$ in the stream and may have less than 30 ppm of $CO_2$ in the stream. For feed streams containing higher amounts of $CO_2$, the stream is treated using a conventional technology, such as a conventional molecular sieve TSA process to remove the $CO_2$ to the desired levels.

The present invention describes a rapid cycle adsorption based process to dehydrate and remove small amounts of $CO_2$ from a gas streams entering a nitrogen rejection unit (NRU) in a nitrogen rejection system. The process utilizes parallel channel adsorbent beds, wherein the adsorbent beds are used to preferentially adsorb $H_2O$ and $CO_2$ from the gaseous feed stream to produce a product stream that has less than 0.1 ppm of $H_2O$ and less than 30 ppm of $CO_2$, which then enters a cryogenic NRU for removal of nitrogen. The adsorbed $CO_2$ gas in these adsorbent beds is removed using a large volume purge stream available as the sales methane product from the NRU and/or injection nitrogen stream from the NRU.

The present techniques provide a method to dehydrate and remove $CO_2$ down to nitrogen rejection specification in a small compact system. The present techniques lessen the overall footprint, weight, and capital expense compared to a conventional molecular sieve configurations used for the final polishing step, while treating the gaseous feed stream to nitrogen rejection specifications. Additionally, the present techniques may be integrated with the rapid cycle swing adsorption based dehydration processes to produce an integrated dehydration and $CO_2$ removal method. In such method, a gaseous feed stream containing moisture and $CO_2$ is introduced into the adsorbent bed units to remove these contaminants and create a product stream that is at nitrogen rejection specifications. The adsorbent bed holding the removed contaminants from the gaseous feed stream is subjected to and regenerated by a pressure or a pressure and temperature swing process, where the contaminants are transferred to the purge streams.

As an example, the gaseous feed stream may be provided to a nitrogen rejection system containing moisture and a small amount of $CO_2$. This feed stream may be introduced into the structured adsorbent bed of a first adsorbent bed unit to preferentially adsorb the $CO_2$ or $H_2O$ from the stream and then the resulting stream is introduced to a second adsorbent bed unit to preferentially adsorb the other of the $CO_2$ or $H_2O$ from the stream. In addition to using two separate adsorbent bed units, a single integrated adsorbent bed unit may be used to remove these contaminants. The product stream exiting the adsorbent bed units is introduced into a nitrogen rejection units (NRU), where it is separated into two streams. One of the streams is rich in methane and the other stream is rich in nitrogen. The methane and nitrogen streams from the NRU may be available at low pressures of about 100 pounds per square inch absolute (psia). The methane stream may be provided as a sales methane stream, which may be compressed to pipeline pressure, while the nitrogen may be compressed to injection pressure or may not involve compression if the nitrogen stream is being vented.

In one or more embodiments, the present techniques provide a unique combination of rapid cycle swing adsorption to provide the necessary separation. The process may include performing one or more adsorption steps and one or more regenerations steps. The adsorption steps may include one or more repressurize steps, which are used to increase the pressure within the adsorbent bed unit with each successive step. The adsorption step may also include passing a gaseous feed stream through the adsorbent bed unit to remove one or more contaminants from the feed stream. The regenerations steps may include one or more depressurization steps, such as one or more purge steps and/or one or more blowdown steps, where the pressure within the housing of the adsorbent bed unit is reduced for each subsequent step.

In the present techniques, the process may include performing various steps in a cycle for a variety of adsorbent bed units that operate together to prepare the feed stream for the nitrogen rejection unit. For example, in an adsorption or feed step, feed stream may be introduced into an adsorbent bed containing an adsorbent material chosen to preferentially adsorb $H_2O$. Then, the product stream exiting the first adsorbent bed, which is the first product stream, is at nitrogen rejection specification for $H_2O$ (e.g., containing less than 0.1 ppm of $H_2O$). Then, the first product stream is introduced into a second adsorbent bed containing absorbent material chosen to preferentially adsorb $CO_2$. Then, the second product stream is at nitrogen rejection specification for $CO_2$ (e.g., containing less than 50 ppm of $CO_2$ or less than 30 ppm of $CO_2$). As the adsorbent bed nears saturation, the feed stream is interrupted and diverted to a different adsorbent bed, and the current adsorbent bed is regenerated in a regeneration step. The regeneration step results in desorption of some of the methane gas that co-adsorbed with $H_2O$ and/or $CO_2$ during the adsorption step. By way of example, the blowdown output stream is typically of high purity and can be compressed to mix with the product stream which is at nitrogen rejection specifications. Alternatively, if there is a higher amount of $H_2O$ and/or $CO_2$ in this stream, then it can be compressed to mix with the feed stream or conducted away from the process.

After the adsorption step, one or more regeneration steps are performed. For example, a first step in the regeneration step may be a depressurization step, which may be a blowdown step. The blowdown step may involve lessening the pressure within the adsorbent bed unit is lessened to the residue gas pressure. This results in desorption of a small amount of methane that is co-adsorbed with $CO_2$ during the previous adsorption step. If methane is not being used in the subsequent regeneration step, this gas can be routed to mix with the methane stream being compressed at a suitable pressure.

Next, the adsorbent bed unit performs a purge step, which may be performed with a methane gas stream from the NRU. The purge pressure for purge stream may be selected such that the purge stream is provided at an intermediate pressure in the compression train and returned after the purge step to compress back to final sales pressure. The purge pressure can also be the sales pressure. Depending upon the amount $H_2O$ and/or $CO_2$ being adsorbed in the adsorption step, some or the entire gas stream may need to be heated to provide the necessary temperature swing to regenerate the adsorbent bed and remove the $CO_2$. The sales methane stream may contain the previously adsorbed $H_2O$ and/or $CO_2$. If the moisture content in this stream is above pipeline specification, a TEG dehydration unit may be utilized to further process the stream. As only a trace amount of $CO_2$ is being removed, no further $CO_2$ removal may be necessary to be under the sales gas specification (e.g., less than or equal to 2% $CO_2$ in the stream).

For certain configurations, nitrogen may be injected back into the ground to a subsurface region. Accordingly, one or more of the purge steps may include using the nitrogen stream from the NRU. Further, in another configuration, at least a portion of the methane stream and at least a portion of the nitrogen stream may be used sequentially to purge the adsorbent beds. This configuration may also lessen the heat required for regeneration.

After the purge, the adsorbent bed may be subject to the repressurize step and the adsorption step as the regeneration of this adsorbent bed is complete. The adsorbent bed is repressurized using the feed stream at the feed pressure and placed back into service on the adsorption step. Multiple adsorbent beds may be operated out of synchronization with each other to ensure a continuous flow of feed stream to the NRU.

The present techniques may perform a separation process to remove both $H_2O$ and $CO_2$ in the same adsorbent bed and/or individual adsorbent beds may be used to dehydrate and remove $CO_2$ separately. Similar regeneration schemes may be used to regenerate the adsorbent beds in these different configurations. Furthermore, the nitrogen stream from the NRU may be used to regenerate the dehydration adsorbent bed and methane stream may be used to regenerate the $CO_2$ removal adsorbent bed. This configuration may eliminate the need for a TEG unit on the sales methane product as all the moisture is removed by the nitrogen stream. To minimize the loss of methane from the blowdown step, this stream may be mixed with the low pressure methane available at the NRU and compressed to the sales pressure.

Further, the present techniques may not removal all of the $CO_2$ or $H_2O$ during the regeneration step, but remove a portion of the $CO_2$ and/or $H_2O$ such that the product end of the adsorbent bed has a $CO_2$ loading sufficiently low to provide a product stream with less than 30 ppm $CO_2$. Accordingly, the product end of the adsorbent bed may be maintained nearly free of $CO_2$ (e.g., the $CO_2$ loading for the region near the product end is less than 1 millimole per gram (mmol/g), less than 0.5 mmol/g or less than 0.1 mmol/g). The loading level of $CO_2$ may be lower on the feed side of the adsorbent bed during the purge step, but the length of adsorbent bed that contains $CO_2$ is reduced during the purge step. For example, a feed region may be a specific portion of the adsorbent bed from the feed end of the adsorbent bed to 10% of the bed length, from the feed end of the adsorbent bed to 25% of the bed length or from the feed end of the adsorbent bed to 40% of the bed length. The product region may be a specific portion of the adsorbent bed from the product end of the adsorbent bed to 10% of the bed length, from the product end of the adsorbent bed to 25% of the bed length or from the product end of the adsorbent bed to 40% of the bed length. The movement of the $CO_2$ front back during purge step and forward during the adsorption step is the basis of the swing capacity of the process. In part, this is achieved by using a limited, cost effective quantity of purge gas in the purge steam along with the heating of the adsorbent bed in this process and configuration.

The present techniques may involve using two or more adsorbent beds, which are operated on similar cycle that are performing different steps of the cycles (e.g., not synchronized with each other) to maintain a steady flow of fluids for the various streams (e.g., feed stream, product stream, optional heating stream, and purge stream). For example, the feed stream may operate at a feed pressure that may range from 40 to 150 bar, while the purge pressure in the purge stream may be between the NRU product pressure and sales methane pressure and can be optimized to minimize the amount of temperature swing necessary.

Further, in other embodiments, the feed temperature may be in the range between 0° F. and 200° F., in the range between 20° F. and 175° F. or in the range between 40° F. and 150° F. The blowdown pressure, heating pressure, and purge pressure may be adjusted depending on the cycle, may depend upon the adsorbent material being utilized and/or may range from vacuum to feed pressure.

Furthermore, in certain embodiments, the present techniques may be used to separate any two or more contaminants from the feed stream. For example, if the feed stream includes additional equipment (e.g., dehydration adsorption unit, such as molecular sieve adsorption unit and/or dehydration adsorbent bed unit) to remove water from the stream, which is may be integrated with the adsorbent bed unit of the present techniques. For example, a dehydration process may be performed upstream of the $CO_2$ removal in the adsorbent bed units by dehydration equipment, such as a molecular sieve or a swing adsorption process (e.g., the swing adsorption process may be RCPSA and/or RCTSA). In particular, a molecular sieve unit or a first adsorbent bed unit may be used to remove water, while a second adsorbent bed unit may be used to remove $CO_2$. Alternatively, in another configuration, an integrated rapid cycle adsorption system may be utilized to remove multiple contaminants (e.g., water and $CO_2$). Suitable adsorbent material or adsorbent layers may be utilized to provide the dehydration, which may be the same or different from the adsorbent material used to in the removal of other contaminants, such as $CO_2$.

Moreover, the present techniques may include a specific process flow to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more purge steps and one or more optional heating steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The purge step may include passing one or more streams from the nitrogen rejection unit to the adsorbent bed units. The purge stream may be formed from at least a portion of the methane stream, from at least a portion of the output from the methane compressor, from at least a portion of the output from the nitrogen compressor, from at least a portion of the nitrogen stream, and any combination thereof. The optional heating step may involve passing a heating stream into the adsorbent bed unit, which may be a recycled stream through the heating loop and is used to heat the adsorbent material.

The purge stream, which may be provided at a purge temperature and purge pressure, may be provided in countercurrent flow relative to the feed stream. The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure near the feed pressure and feed temperature. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration may be for a period greater than 1 second and less than 600 seconds, for a period greater than 2 second and less than 180 seconds or for a period greater than 5 second and less than 90 seconds.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes are further described in U.S. Patent Application Publication Nos. 2008/0282892, 2008/0282887, 2008/0282886, 2008/0282885, 2008/0282884 and 2014/0013955, which are each herein incorporated by reference in their entirety.

Further still, in one or more embodiments, a variety of adsorbent materials may be used to provide the mechanism for the separations. Examples include zeolite 3A, 4A, 5A, ZK4 and MOF-74. However, the process is not limited to these adsorbent materials, and others may be used as well.

Beneficially, the present techniques provide various enhancements over conventional techniques. For example, the present techniques provide a modular design, which may be configured to lessen the footprint, weight, and capital expense of the system used to treat feed gaseous feed stream to comply with nitrogen rejection specifications. Also, as this process does not use any aqueous medium (e.g., an amine wash), subsequent dehydration steps are minimized or eliminated. Further, the present techniques may lessen or eliminate the use of solvents, which remove solvents from the process. Moreover, the present techniques may include reduced emissions (e.g. eliminates amine regenerator vent) as compared to conventional processes. The present techniques may be further understood with reference to the FIGS. 1 to 5 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. In particular, the adsorbent bed units may include a heating loop (not shown), as noted further below, which is used to remove the contaminants from the adsorbent bed. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
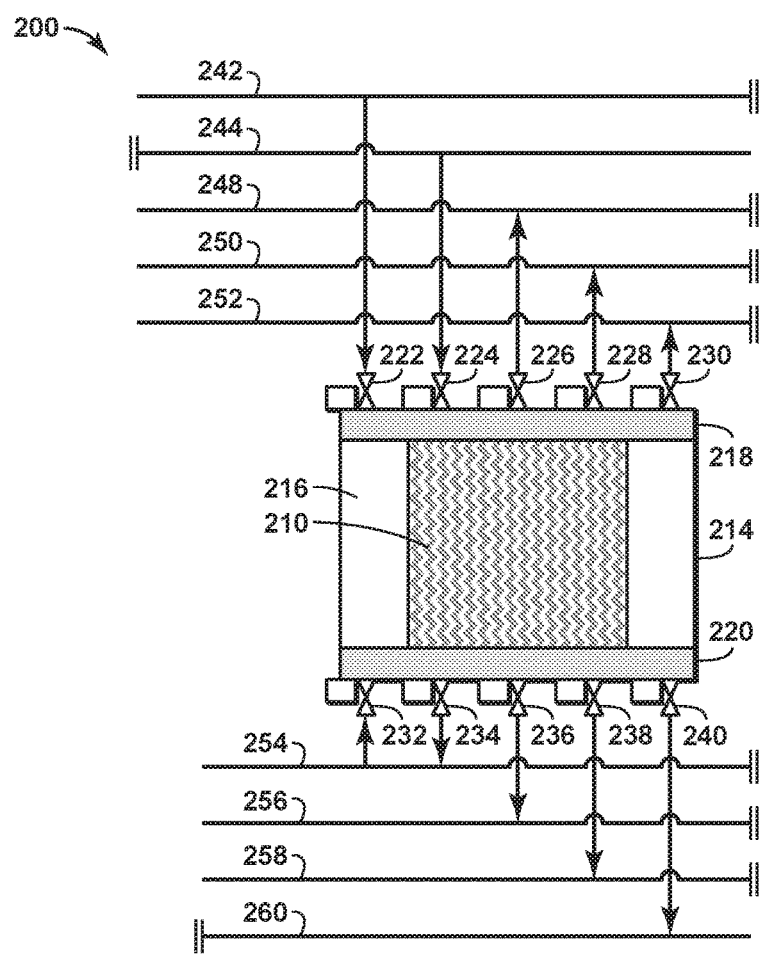
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Figure 3:
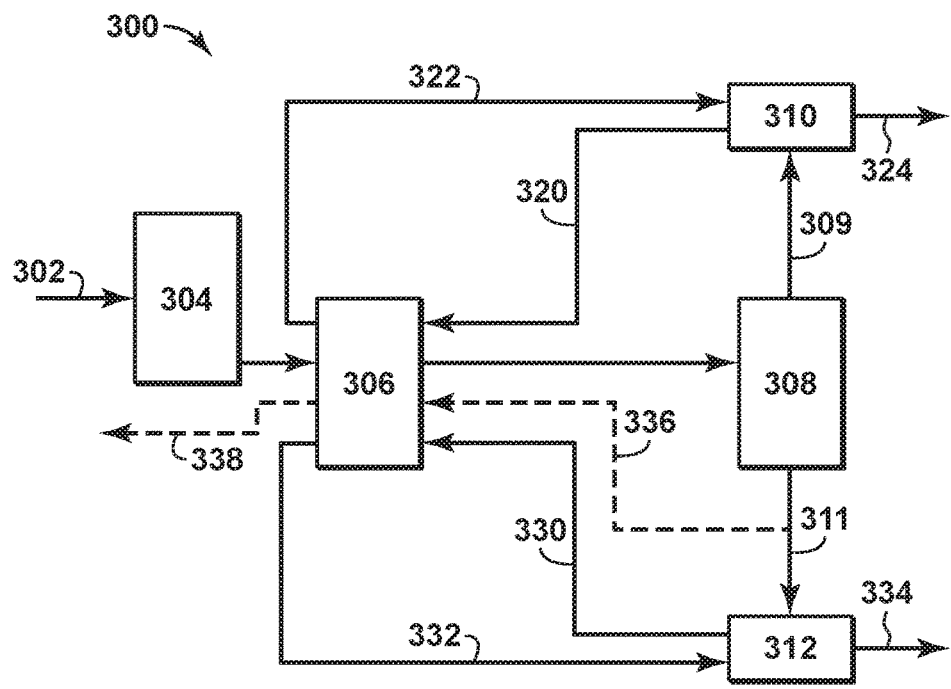
FIG. 3 is an exemplary diagram of a system for treating of a feed stream to form a feed stream for a nitrogen rejection system in accordance with an embodiment of the present techniques.
Figure 4:
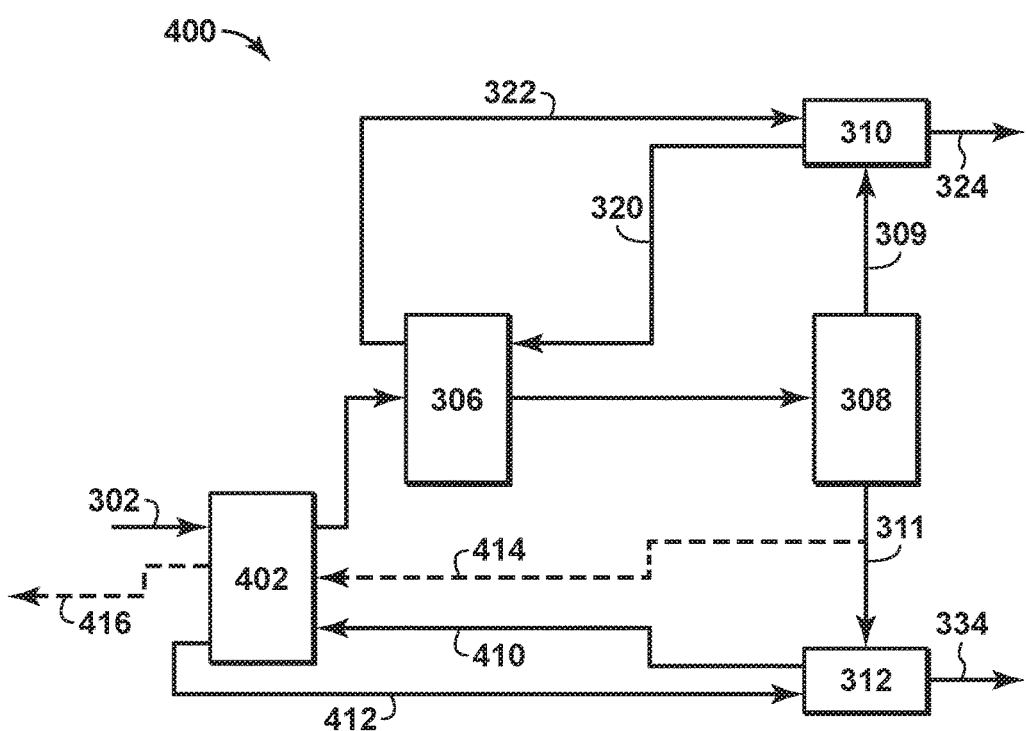
FIG. 4 is an alternative exemplary diagram of a system for treating of a feed stream to form a feed stream for a nitrogen rejection system in accordance with an embodiment of the present techniques.
Figure 5:
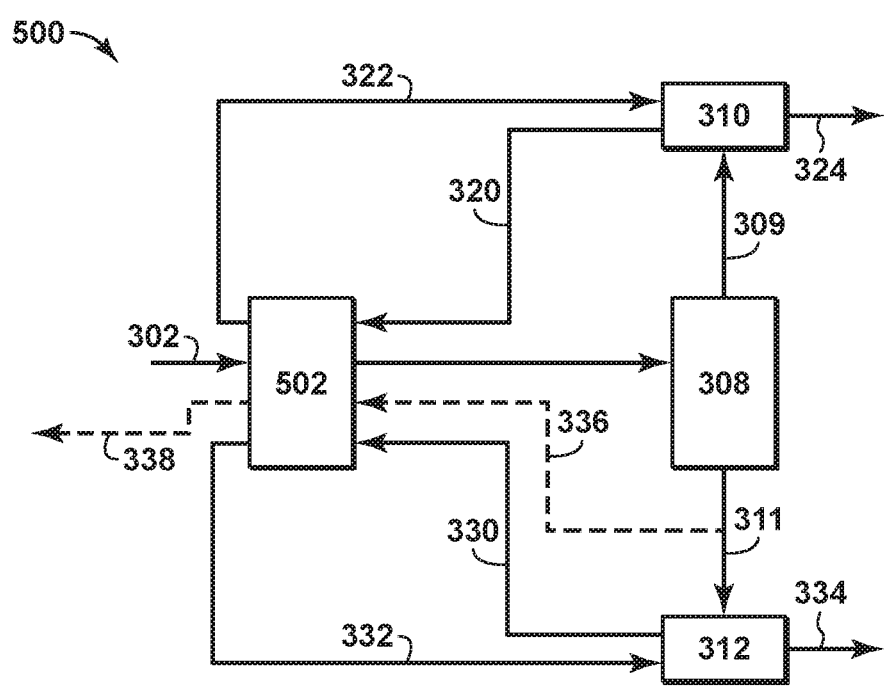
FIG. 5 is another alternative exemplary diagram of a system for treating of a feed stream to form a feed stream for a nitrogen rejection system in accordance with an embodiment of the present techniques.

As described above, natural gas feed streams for nitrogen rejection applications have stringent specifications on the $H_2O$ and $CO_2$ content to ensure against formation of solids at cryogenic temperatures. As such, for nitrogen rejection systems utilize additional treating steps to condition the feed stream. For example, the present techniques may include a configuration that receives a feed stream, conditions the feed stream in a molecular sieve unit to dehydrate the stream before introduction into the adsorbent bed unit. The adsorbent bed unit may perform a rapid cycle swing adsorption process to remove $CO_2$ from the stream to satisfy nitrogen specifications, as shown in FIG. 3. Also, in an alternative embodiment, the feed stream is dehydrated using a first rapid cycle swing adsorption process and $CO_2$ is removed using a second rapid cycle swing adsorption process, as shown in FIG. 4, while the another alternative embodiment may involve an integrated rapid cycle swing adsorption process to dehydrate and remove $CO_2$ from the feed stream to satisfy nitrogen rejection specifications, as shown in FIG. 5.

FIG. 3 is an exemplary diagram 300 of a system for treating of a feed stream to form a feed stream for a nitrogen rejection system in accordance with an embodiment of the present techniques. The system includes a molecular sieve unit 304 configured to remove water upstream of an adsorbent bed unit 306 configured to remove $CO_2$. The adsorbent bed unit 306 may be used to perform a rapid cycle swing adsorption process, which may involve passing various streams through the adsorbent bed unit 306. As part of this process, a purge step may be performed to remove contaminants from the adsorbent bed within the adsorbent bed unit 306. As may be appreciated, the molecular sieve dehydration unit 304 and adsorbent bed unit 306 may include multiple units to perform the respective processes. Further, the molecular sieve dehydration unit 304 and adsorbent bed unit 306 may each operate with different cycles, which involve adsorption steps and regenerations steps in the respective cycles.

In this system, the process a feed stream is provided via conduit 302 to the molecular sieve dehydration unit 304, during its adsorption step. The molecular sieve dehydration unit 304 includes a housing having an adsorbent material disposed within the housing. During the adsorption step, the molecular sieve dehydration unit 304 is configured to lower the water content of the stream to less than 0.1 ppm by adsorbing the water from the stream into the adsorbent material and passing the remaining portion of the stream out of the adsorbent material and the unit. The dehydrated stream from the molecular sieve dehydration unit 304 is provided to the adsorbent bed unit 306 during its adsorption step. The adsorbent bed unit 306, which may include one or more of the adsorbent bed units discussed above in FIGS. 1 and 2, may include a housing with an adsorbent material disposed within the housing. The adsorbent bed unit 306 may be configured to remove at least a portion of the $CO_2$ from the dehydrated stream (e.g., $CO_2$ content to be less than 30 ppm) to form the nitrogen rejection feed stream.

Following the removal of contaminants in units 304 and 306, the nitrogen rejection feed stream is provided for processing in a nitrogen rejection unit (NRU) 308. The NRU 308 may be configured to separate the stream into a methane stream in conduit 309 and a nitrogen stream in conduit 311. The methane stream is passed to a methane compressor 310, which is configured to increase the pressure of the methane stream. The methane compressor 310 may be a two or more stage compressor that is configured to increase the pressure in the methane stream to a purge pressure in a first stage. From this stage, at least a portion of the methane stream may be passed via conduit 320 to the adsorbent bed unit 306 to be used as a methane purge stream. The output methane purge stream from the adsorbent bed unit 306 may be passed via conduit 322 to the methane compressor for a second stage of compression to increase the pressure of the output methane purge stream to the methane sales gas pressure and provide the compressed output methane purge stream to methane sales via conduit 324.

The nitrogen steam in conduit 311 is passed to a nitrogen compressor 312, which is configured to increase the pressure of the nitrogen stream. The nitrogen compressor 312 may be a two or more stage compressor that is configured to increase the pressure in the nitrogen stream to a purge pressure in a first stage. From this stage, at least a portion of the nitrogen stream may be passed via conduit 330 to the adsorbent bed unit 306 to be used as a nitrogen purge stream. The output nitrogen purge stream from the adsorbent bed unit 306 may be passed via conduit 332 to the nitrogen compressor for a second stage of compression to increase the pressure of the output nitrogen purge stream to the nitrogen injection pressure and provide the compressed output nitrogen purge stream for injection into a subsurface region or nitrogen sales via conduit 324.

As an alternative embodiment, the nitrogen steam in conduit 311 may bypass the nitrogen compressor 312 for venting operations. In this configuration, the nitrogen stream may be passed via conduit 336 to the adsorbent bed unit 306 to be used as a nitrogen purge stream at a vent nitrogen purge pressure. The output nitrogen purge stream from the adsorbent bed unit 306 may be passed via conduit 338 for venting.

In this configuration, the system includes one or more purge steps that may be passed through the adsorbent bed unit 306. The purge stream may be formed from at least a portion of the output from the methane compressor unit 310, from at least a portion of the output from the nitrogen compressor unit 312, from at least a portion of the nitrogen stream in conduit 311, and any combination thereof. This purge stream may be passed to the adsorbent bed unit 306 during the purge step as the purge gas or may be different purge steps for the adsorbent bed unit 306.

Further, the purge gas may also be utilized to regenerate the molecular sieve dehydration unit 304. In such configurations, the regeneration stream may be formed from at least a portion of the output from the methane compressor unit 310, from at least a portion of the output from the nitrogen compressor unit 312, from at least a portion of the nitrogen stream in conduit 311, and any combination thereof. This regeneration stream may be passed to the adsorbent bed unit 306 during the regeneration step as the regeneration stream or may be added to a regeneration stream for the molecular sieve dehydration unit 304. Further, this purge stream may be heated in a heating unit (not shown) to further increase the regeneration temperature. The heating unit may be a furnace and/or heat exchanger that is configured to increase the temperature of the regeneration stream and acts as a mechanism to heat the fluids in the regeneration stream. In addition, the regeneration of the molecular sieve dehydration unit 304 may also include the use of a heating loop, which may include a heater, storage vessel, blower (e.g., a compressor) or other equipment.

By way of example, the adsorbent bed unit 306 may perform a swing adsorption process that includes an adsorption step; one or more of a combination of a blowdown step and a purge step; and a repressurization step. By way of example, the sequence of operation for adsorbent bed unit 306 may be an adsorption step that passes a feed stream through the adsorbent bed unit to remove contaminants and form a product stream; hold step; a first blowdown step associated with a first purge; hold step; first purge step with a first purge stream passing through the adsorbent bed unit to remove one or more contaminants from the adsorbent material; hold step; a second blowdown step associated with a second purge step (optional); hold step (optional); a second purge step with second purge stream that passed through the adsorbent bed unit to remove contaminants from the adsorbent material (optional); hold step (optional); repressurization step; hold step; and repeat cycle to another adsorption step. The first purge step and second purge step may include a respective purge stream of predominately methane, nitrogen and/or any combination thereof. The duration of the steps and the number of adsorbent bed units utilized in the cycle may be adjusted such that the overall process is continuous for the feed stream.

FIG. 4 is an alternative exemplary diagram of a system 400 for treating of a feed stream to form a feed stream for a nitrogen rejection system in accordance with an embodiment of the present techniques. In this system 400, the feed stream may be dehydrated using an adsorbent bed unit for the dehydration, such as dehydration adsorbent bed unit 402, which is in fluid communication with the adsorbent bed unit 306, which is configured to remove a portion of the $CO_2$. The adsorbent bed units 402 and 306 may be used to perform rapid cycle swing adsorption processes, which may involve passing various streams through the adsorbent bed units 402 and 306. As part of this process, a purge step may be used to remove contaminants from the adsorbent beds within the respective adsorbent bed units 402 and 306. As may be appreciated, the dehydration adsorbent bed unit 402 and adsorbent bed unit 306 may include multiple units to perform the processes in the respective units. Further, the dehydration adsorbent bed unit 402 and adsorbent bed unit 306 may each operate with different cycles, which involve adsorption steps and regenerations steps in the respective cycles. Also, as certain equipment or units are similar to those in FIG. 3, the equipment and units are referenced by the same reference character in this system 400.

In this system, the process begins with the feed stream introduction into the dehydration adsorbent bed unit 402 via the conduit 302. The dehydration adsorbent bed unit 402 includes a housing having an adsorbent material disposed within the housing, which may be one of the adsorbent bed units noted above in FIGS. 1 and 2. During the adsorption step, the dehydration adsorbent bed unit 402 is configured to lower the water content of the stream to less than 0.1 ppm water by adsorbing the water from the stream into the adsorbent material and passing the remaining portion of the stream out of the adsorbent material and the unit. The dehydrated stream from the dehydration adsorbent bed unit 402 is provided to the swing adsorbent bed unit 306 during its adsorption step, which may be handled in a manner similar as noted above in the discussion of FIG. 3. Following the removal of contaminants in units 402 and 306, the nitrogen rejection feed stream is subjected to nitrogen rejection processing in the NRU 308, methane compressor 310 and nitrogen compressor 312 in manner similar to the discussion of FIG. 3 above. The processing results in the methane stream and nitrogen stream.

Similar to the FIG. 3, the methane compressor 310 may be a two or more stage compressor that is configured to increase the pressure in the methane stream to a purge pressure in a first stage. From this stage, at least a portion of the methane stream may be passed via conduit 320 to the adsorbent bed unit 306 to be used as a methane purge stream. The output methane purge stream from the adsorbent bed unit 306 may be passed via conduit 322 to the methane compressor for a second stage of compression to increase the pressure of the output methane purge stream to the methane sales gas pressure and provide the compressed output methane purge stream to methane sales via conduit 324.

However, in the configuration the nitrogen stream may be used to purge the dehydration adsorbent bed unit 402. For example, in this system 400, the nitrogen steam in conduit 311 is passed to a nitrogen compressor 312, which is configured to increase the pressure of the nitrogen stream. The nitrogen compressor 312 may pass at least a portion of the nitrogen stream via conduit 410 to the adsorbent bed unit 402 to be used as a nitrogen purge stream. The output nitrogen purge stream from the adsorbent bed unit 402 may be passed via conduit 412 to the nitrogen compressor for a second stage of compression to increase the pressure of the output nitrogen purge stream to the nitrogen injection pressure and provide the compressed output nitrogen purge stream for injection into a subsurface region or nitrogen sales via conduit 324.

As an alternative embodiment, the nitrogen steam in conduit 311 may bypass the nitrogen compressor 312 for venting operations. In this configuration, the nitrogen stream may be passed via conduit 414 to the adsorbent bed unit 402 to be used as a nitrogen purge stream at a vent nitrogen purge pressure. The output nitrogen purge stream from the adsorbent bed unit 402 may be passed via conduit 416 for venting.

In this configuration, the system 400 may include various purge steps for the regeneration step in the cycle for the adsorbent bed unit 306 and the regeneration step in the cycle for the adsorbent bed unit 402. For example, the purge stream for either adsorbent bed unit 402 and 306 may be formed from at least a portion of the output from the methane compressor unit 310, from at least a portion of the output from the nitrogen compressor unit 312, from at least a portion of the nitrogen stream in conduit 311, and any combination thereof. Furthermore, the purge gas from adsorbent bed unit 306, which is stream 322, may be used to purge adsorbent bed unit 402. Adsorbent bed unit 306 may be purged first in this sequence. In such configuration, the adsorbent bed unit 306 may have any of the nitrogen streams as an additional purge gas for a purge stream, which may result in cycles similar to the sequence described for FIG. 3.

By utilizing the purge streams in the configurations, the integration of the nitrogen rejection unit 308 and the adsorbent bed units 402 and 306 provides various enhancements. For example, one enhancement may be the lessening the overall footprint, weight, and capital expense compared to a conventional molecular sieve configuration or even the configuration in FIG. 3. Additionally, the integrated rapid cycle swing adsorption processes for dehydration and $CO_2$ removal may create a product stream that is at nitrogen rejection specifications, while removing the contaminants through the purge streams.

By way of example, the sequence of operation for adsorbent bed unit 306 may include an adsorption step, blowdown step, purge step, repressurization step and then the cycle may repeat for an additional cycle that begins with another adsorption step. In particular, the cycle may include an adsorption step with a feed stream passing through the adsorbent bed unit 306 to remove one or more contaminants from the feed stream and form a product stream; a hold step; a blowdown step; a hold step; a purge step with a purge stream passing through the adsorbent bed unit to remove one or more contaminants; a hold step; a repressurization step; and a hold step (optional); and then the process repeats the steps for another cycle.

FIG. 5 is another alternative exemplary diagram of a system for treating of a feed stream to form a feed stream for a nitrogen rejection system in accordance with an embodiment of the present techniques. In this system 500, an integrated rapid cycle swing adsorption process is used to dehydrate and remove $CO_2$ from the feed stream to form a stream that complies with nitrogen rejection specifications. In particular, the feed stream may be dehydrated and have the $CO_2$ removed by using an adsorbent bed unit 502. The adsorbent bed unit 502 may be used to perform a rapid cycle swing adsorption processes, which may involve passing various streams through the adsorbent bed unit 502 in a manner similar to those noted above for adsorbent bed unit 306 in FIG. 3. As may be appreciated, the adsorbent bed unit 502 may include multiple units to perform the processes. Further, the adsorbent bed unit 502 may operate with a cycle, which involve adsorption steps and regenerations steps. Also, as certain equipment or units are similar to those in FIG. 3, the equipment and units are referenced by the same reference character in this system 500.

In this system, the process begins by passing the feed stream to the adsorbent bed unit 502 from the conduit 302, during its adsorption step. The adsorbent bed unit 502 includes a housing having an adsorbent material disposed within the housing, which may be one of the adsorbent bed units noted above in FIGS. 1 and 2. The adsorbent bed may include an adsorbent material that is configured to have a higher selectivity to water and $CO_2$ and/or may include two or more adsorbent materials, with each having a higher selectivity to water or $CO_2$. During the adsorption step, the adsorbent bed unit 502 is configured to lower the water content of the stream to less than 0.1 ppm water by adsorbing the water from the stream into the adsorbent bed; to lower the $CO_2$ content of the stream to less than 30 ppm by adsorbing the $CO_2$ from the stream into the adsorbent bed; and to pass the remaining portion of the stream out of the adsorbent bed and the unit. The decontaminated stream from the adsorbent bed unit 502 is provided as the nitrogen rejection feed stream to the nitrogen rejection unit 308, the methane compressor 310 and the nitrogen compressor 312, which may operate in manner similar to the discussion of FIG. 3 above.

In this configuration, the system 500 includes one or more purge steps which may be performed by various purge streams. For example, the methane stream is passed to a methane compressor 310, which is configured to increase the pressure of the methane stream. From the first stage, at least a portion of the methane stream may be passed via conduit 320 to the adsorbent bed unit 306 to be used as a methane purge stream. The methane purge may be the only purge step performed and/or may be the second purge performed on the adsorbent bed unit 502. The output methane purge stream from the adsorbent bed unit 502 may be passed via conduit 322 to the methane compressor for a second stage of compression to increase the pressure of the output methane purge stream to the methane sales gas pressure and provide the compressed output methane purge stream to methane sales via conduit 324.

The nitrogen steam in conduit 311 is passed to a nitrogen compressor 312, which is configured to increase the pressure of the nitrogen stream. From the first stage, at least a portion of the nitrogen stream may be passed via conduit 330 to the adsorbent bed unit 306 to be used as a nitrogen purge stream, which may be a first purge of the adsorbent bed unit 502. The output nitrogen purge stream from the adsorbent bed unit 306 may be passed via conduit 332 to the nitrogen compressor for a second stage of compression to increase the pressure of the output nitrogen purge stream to the nitrogen injection pressure and provide the compressed output nitrogen purge stream for injection into a subsurface region or nitrogen sales via conduit 324.

As an alternative embodiment, the nitrogen steam in conduit 311 may bypass the nitrogen compressor 312 for venting operations. In this configuration, the nitrogen stream may be passed via conduit 336 to the adsorbent bed unit 306 to be used as a nitrogen purge stream at a vent nitrogen purge pressure. The nitrogen purge may be the only purge, the second purge step in this configuration with the methane stream being used for the first purge step. The output nitrogen purge stream from the adsorbent bed unit 306 may be passed via conduit 338 for venting.

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; optionally performing a heating step, wherein the heating step increases the temperature of the adsorbent bed unit to form a temperature differential between the feed end of the adsorbent bed and the product end of the adsorbent bed; and performing a purge step, wherein the purge step reduces the pressure within the adsorbent bed unit; performing a repressurize or re-pressurization step, wherein the re-pressurization step increases the pressure within the adsorbent bed unit; and repeating the steps for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In one or more embodiments, when using RCTSA the total cycle times are typically less than 600 seconds, preferably less than 180 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A process for removing contaminants from a gaseous feed stream, the process comprising:
   a. performing one or more adsorption steps, wherein each of the one or more adsorption steps comprise passing a gaseous feed stream through an adsorbent bed unit having an adsorbent bed to separate one or more contaminants from the gaseous feed stream to form a product stream that is conducted away to a nitrogen rejection unit configured to form a methane stream and a nitrogen stream;
   b. performing one or more depressurization steps, wherein the pressure within the adsorbent bed unit is reduced by a predetermined amount with each successive depressurization step;
   c. performing a purge step, wherein the purge step comprises passing a first purge stream into the adsorbent bed unit, wherein the purge stream is passed in a countercurrent direction relative to the direction of the feed stream and wherein the first purge stream comprises at least a portion of the methane stream; and
   d. repeating the steps a) to c) for at least one additional cycle, wherein the cycle duration is for a period greater than 1 second and less than 600 seconds.

2. The process of claim 1, wherein the first purge stream further comprises at least a portion of the nitrogen stream.

3. The process of claim 1, further comprising performing a second purge step, wherein the second purge step comprises passing a second purge stream into the adsorbent bed unit, wherein the second purge stream is passed in a countercurrent direction relative to the direction of the feed stream and wherein the second purge stream comprises one of at least a portion of the methane stream, at least a portion of the nitrogen stream, and any combination thereof.

4. The process of claim 3, wherein the second purge stream comprises at least a portion of the nitrogen stream.

5. The process of claim 1, wherein the gaseous feed stream is a hydrocarbon containing stream having greater than one volume percent hydrocarbons based on the total volume of the gaseous feed stream.

6. The process of claim 1, wherein the adsorbent bed unit is configured to lower the carbon dioxide ($CO_2$) level to less than 30 parts per million.

7. The process of claim 1, wherein the gaseous feed stream is provided at a feed pressure in the range between 50 bar absolute (bara) and 150 bara and at a feed temperature in the range between 0° F. and 200° F.

8. The process of claim 1, wherein performing one or more adsorption steps further comprises passing the gaseous feed stream to a molecular sieve unit configured to conduct away a portion of the $H_2O$ in the gaseous feed stream and to pass the gaseous feed stream to the adsorbent bed unit.

9. The process of claim 1, wherein performing one or more adsorption steps further comprises passing the gaseous feed stream to a dehydration adsorbent bed unit configured to conduct away a portion of the $H_2O$ in the gaseous feed stream and to pass the gaseous feed stream to the adsorbent bed unit.

10. The process of claim 9, wherein the dehydration adsorbent bed unit is configured to:
    a) perform one or more adsorption steps, wherein each of the one or more adsorption steps comprise passing the gaseous feed stream through the dehydration adsorbent bed unit having a dehydration adsorbent bed to separate $H_2O$ from the gaseous feed stream; b) perform one or more depressurization steps, wherein the pressure within the dehydration adsorbent bed unit is reduced by a predetermined amount with each successive depressurization step;
    c) perform a purge step, wherein the purge step comprises passing a dehydration purge stream into the dehydration adsorbent bed unit, wherein the dehydration purge stream is passed in a countercurrent direction relative to the direction of the gaseous feed stream and wherein the dehydration purge stream comprises one of at least a portion of the methane stream, at least a portion of the nitrogen stream, and any combination thereof; and
    d) repeat the steps a) to c) for at least one additional cycle, wherein the cycle duration is for a period greater than 1 second and less than 600 seconds.

11. The process of claim 10, wherein the dehydration purge stream comprises at least a portion of the nitrogen stream.

12. The process of claim 1, further comprising compressing the one of at least a portion of the methane stream, at least a portion of the nitrogen stream, and any combination thereof prior to passing the purge stream into the adsorbent bed unit.

13. The process of claim 1, wherein the cycle duration is greater than 2 seconds and less than 180 seconds.

14. A system for removing contaminants from a gaseous feed stream, the system comprising:
- an adsorbent bed unit configured to separate contaminants from a gaseous feed stream and to output a product stream, wherein the adsorbent bed unit comprises an adsorbent bed and the adsorbent bed unit is configured to perform a rapid cycle swing adsorption process;
- a nitrogen rejection unit in fluid communication with the adsorbent bed unit and configured to receive the product stream and separate the product stream into a methane stream and a nitrogen stream; and
- wherein the adsorbent bed unit is configured to pass a first purge stream through the adsorbent bed, wherein the first purge stream is passed in a countercurrent direction relative to the direction of the feed stream and wherein the purge stream comprises at least a portion of the methane stream.

15. The system of claim 14, further comprising a dehydration adsorption unit in fluid communication with the adsorbent bed unit and configured to conduct away $H_2O$ from the gaseous feed stream and pass the gaseous feed stream to the adsorbent bed unit.

16. The system of claim 15, wherein the dehydration adsorption unit is a molecular sieve adsorption unit.

17. The system of claim 15, wherein the dehydration adsorption unit is a dehydration adsorbent bed unit configured to perform a rapid cycle swing adsorption process.

18. The system of claim 17, wherein the dehydration adsorbent bed unit is configured to pass a dehydration purge stream into the dehydration adsorbent bed unit, wherein the dehydration purge stream is passed in a countercurrent direction relative to the direction of the gaseous feed stream and wherein the dehydration purge stream comprises at least a portion of the methane stream.

19. The system of claim 14, wherein the adsorbent bed unit is configured to lower the carbon dioxide ($CO_2$) level to less than 30 parts per million molar.

20. The system of claim 14, wherein the adsorbent bed unit is configured to lower the water ($H_2O$) level to less than 0.1 parts per million molar.

21. The system of claim 14, wherein the first purge stream further comprises at least a portion of the nitrogen stream.

22. The system of claim 18, wherein the dehydration purge stream further comprises at least a portion of the nitrogen stream.

* * * * *